US00RE44932E

(19) United States
(12) Reissued Patent
Whiteley et al.

(10) Patent Number: US RE44,932 E
(45) Date of Reissued Patent: Jun. 3, 2014

(54) COMPUTER-IMPLEMENTED SYSTEM FOR RECORDING OIL AND GAS INSPECTION DATA

(75) Inventors: Thomas Whiteley, Houston, TX (US); Wilson S. Wimberley, Houston, TX (US); Lane S. Wimberley, legal representative, Austin, TX (US); Bryan Lane, Houston, TX (US)

(73) Assignee: PPI Technology Services

(21) Appl. No.: 12/852,264

(22) Filed: Aug. 6, 2010

Related U.S. Patent Documents

Reissue of:
(64) Patent No.: 7,664,685
Issued: Feb. 16, 2010
Appl. No.: 11/761,259
Filed: Jun. 11, 2007

U.S. Applications:
(63) Continuation-in-part of application No. 10/277,531, filed on Oct. 22, 2002, now Pat. No. 7,603,296.

(51) Int. Cl.

| | |
|---|---|
| ***G06G 1/14*** | (2006.01) |
| ***G06Q 20/00*** | (2012.01) |
| ***G06Q 10/00*** | (2012.01) |
| ***G06Q 50/00*** | (2012.01) |
| ***G06Q 20/20*** | (2012.01) |
| ***G06Q 10/08*** | (2012.01) |
| *G01M 3/00* | (2006.01) |

(52) U.S. Cl.
CPC ..... *G06Q 20/203* (2013.01); *G06Q 10/087* (2013.01); *G01M 3/005* (2013.01)
USPC ..... 705/28; 705/1.1; 705/7.11; 705/22; 705/314; 702/184; 702/186; 709/217; 73/865.8

(58) Field of Classification Search
CPC .... G06Q 20/203; G06Q 10/087; G01M 3/005
USPC ..... 73/865.8; 709/217; 705/2, 314, 7.42, 705/44, 7.27; 1/1; 707/999.003, 999.101, 707/999.107
See application file for complete search history.

(56) References Cited

U.S. PATENT DOCUMENTS 5,656,786 A * 8/1997 Curtis et al. ..... 73/865.8
5,931,877 A * 8/1999 Smith et al. ..... 701/31.5

(Continued)

OTHER PUBLICATIONS

Brent M Kleinheksel, Say "goodbye" to static URLs, Apr. 2000, Direct Marketing, 62(12), 30-32. Retrieved Nov. 12, 2009, from ABI/Inform Global. (Document ID: 54049923).*

(Continued)

*Primary Examiner* — Olusegun Goyea
(74) *Attorney, Agent, or Firm* — Edmonds & Nolte, PC

(57) ABSTRACT

A system for recording oil and gas inspection data comprising an inspection database server; a server-side vendor inspection database; at least one inspector client device; an inspector-side vendor inspection database; at least one customer client device; wherein at least one inspector inputs oil and gas inspection data to the inspection database server; wherein the inspection database server comprises computer instructions for instructing the inspection database server to provide at least one report; wherein the at least one inspector client device and the at least one customer client device are operable to access the oil and gas inspection data, the at least one report, or combinations thereof; and wherein the computer instructions instruct the inspection database server to formulate the at least one report for selected oil and gas inspection data and communicate the at least one report for viewing by at least one customer upon demand.

18 Claims, 2 Drawing Sheets

(56) References Cited

U.S. PATENT DOCUMENTS

| | | | | |
|---|---|---|---|---|
| 6,275,153 | B1 | 8/2001 | Brooks | |
| 6,275,570 | B1 * | 8/2001 | Homan et al. | 379/88.17 |
| 6,333,699 | B1 | 12/2001 | Zierolf | |
| 6,333,700 | B1 | 12/2001 | Thomeer et al. | |
| 6,370,455 | B1 * | 4/2002 | Larson et al. | 701/33 |
| 6,442,460 | B1 * | 8/2002 | Larson et al. | 701/33 |
| 7,047,159 | B2 * | 5/2006 | Muehl et al. | 702/184 |
| 7,048,185 | B2 * | 5/2006 | Hart | 235/384 |
| 7,076,532 | B2 * | 7/2006 | Craik | 709/217 |
| 7,395,273 | B2 * | 7/2008 | Khan et al. | 1/1 |
| 7,825,770 | B2 * | 11/2010 | Postelwait et al. | 340/5.92 |
| 7,944,345 | B2 * | 5/2011 | Brinton et al. | 340/439 |
| 8,150,721 | B2 * | 4/2012 | Apostolides | 705/7.27 |
| 8,315,198 | B2 * | 11/2012 | Corneille et al. | 370/313 |
| 2001/0002464 | A1 * | 5/2001 | Hogan | 702/186 |
| 2001/0047283 | A1 * | 11/2001 | Melick et al. | 705/8 |
| 2002/0130818 | A1 * | 9/2002 | Viertl | 345/1.1 |
| 2002/0147732 | A1 * | 10/2002 | Lee et al. | 707/200 |
| 2003/0041044 | A1 * | 2/2003 | Monestere, III | 707/1 |
| 2003/0069716 | A1 * | 4/2003 | Martinez | 702/188 |
| 2005/0246217 | A1 * | 11/2005 | Horn | 705/9 |
| 2006/0036725 | A1 * | 2/2006 | Chand | 709/223 |
| 2006/0195550 | A1 * | 8/2006 | Craik | 709/217 |
| 2006/0235611 | A1 * | 10/2006 | Deaton et al. | 701/207 |
| 2007/0002929 | A1 * | 1/2007 | Frankel et al. | 374/121 |
| 2007/0027704 | A1 * | 2/2007 | Patel et al. | 705/1 |
| 2007/0050206 | A1 * | 3/2007 | Whikehart et al. | 705/2 |
| 2008/0052320 | A1 * | 2/2008 | Lee et al. | 707/104.1 |
| 2008/0126305 | A1 * | 5/2008 | Sayeler et al. | 707/3 |
| 2011/0010221 | A1 * | 1/2011 | Horn | 705/9 |
| 2011/0087595 | A1 * | 4/2011 | Sabella | 705/44 |

OTHER PUBLICATIONS

Greco, Monica. (Sep. 1995). Cross-system barriers fall. Apparel Industry Magazine, 56(9), 70. Retrieved Nov. 12, 2009, from ABI/Inform Global. (Document ID: 6940623).*

Cassford, G & Teale, D. "Talking with computers-a quality control application", May 1987, British Robot Assoc, Kempston, New Frontiers in Manufacturing. Proceedings of the 10th Annual British Robot Association Conference, May 1987, p. 97-105.*

* cited by examiner

COMPUTER-IMPLEMENTED SYSTEM FOR RECORDING OIL AND GAS INSPECTION DATA

Matter enclosed in heavy brackets [ ] appears in the original patent but forms no part of this reissue specification; matter printed in italics indicates the additions made by reissue.

CROSS REFERENCE TO RELATED APPLICATION

This patent application is a continuation-in-part application that claims the benefit, under 35 USC §120, of the prior non-provisional application Ser. No. 10/277,531, which was filled Oct. 22, 2002 *now U.S. Pat. No. 7,603,296*. The prior co-pending non-provisional application is incorporated by reference along with its appendices.

FIELD

The present embodiments relate to a computer-implemented system for recording oil and gas inspection data in an on-line computing environment.

BACKGROUND

A need exists for a computer-implemented system for receiving oil and gas inspection data for oil and/or gas equipment, processes, facilities, personnel, and equipment for related processes that is capable of seamlessly and automatically standardizing and synchronizing information between a centralized server and a client-side device.

A further need exists for a computer-implemented system for receiving oil and gas inspection data that is able to be accessed from any remote location.

A need also exists for a computer-implemented system for receiving oil and gas inspection data that can automatically track certain information input to the system and automatically provide a customer with reports containing the selected information for process improvement, improved equipment selection, and improved vendor selection.

The present embodiments meet these needs.

BRIEF DESCRIPTION OF THE DRAWINGS

The detailed description will be better understood in conjunction with the accompanying drawings as follows.

Figure 1:
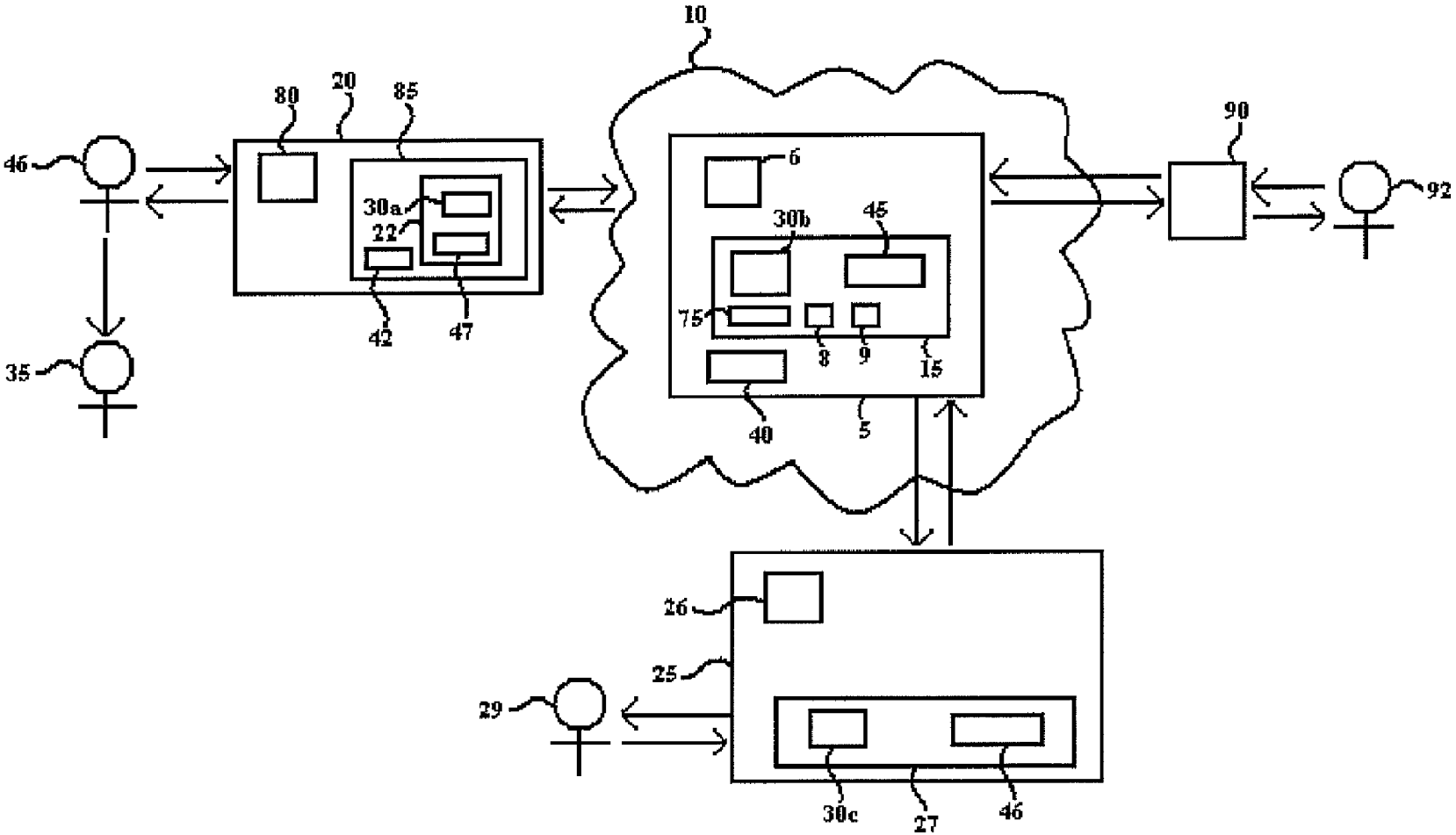
FIG. 1 depicts a diagram of the components of an embodiment of the present system.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments relate to a computer-implemented system for recording oil and gas inspection data in an on-line computing environment.

Oil and gas inspection data can include data relating to oil production, transportation, refinement and related equipment, natural gas production, transportation, refinement and related equipment, and equipment for related processes, such as waterflood equipment. Oil and gas inspection data can also include data relating to oil and/or gas production processes, such as well stimulation processes, drilling and completion processes, transportation processes, refining processes, manufacturing processes for oil and gas equipment, related processes, such as welding qualification or non-destructive examination, and related facilities and materials. Oil and gas inspection data can further include information regarding employees, contractors, and other associated personnel who perform any manufacturing, refining, production, transportation, or assembly processes.

One advantage of the present system is that the present system utilizes parallel inspector-side and server-side databases to ensure standardized oil and gas inspection data. Standardized inspection information allows for the creation of detailed reports, control over inspection reporting, control over inspection time and expenses, standardization of input formats, ease of collecting billable time associated with inspections, and ease of collecting billable expenses associated with inspections. A manager or customer can also access the information from any remote location that can access the server network to manage information for billing or paying of time, or to retrieve, view, or collect data.

The client and server databases can be seamlessly and automatically synchronized, updating inspector-side databases with critical accounting information regarding old customers, new customers, vendors, and other individuals for future use in preparing inspection reports. The seamless, automatic synchronization can simultaneously update the server-side database with oil and gas inspection data that has been input to the inspector-side databases.

An additional advantage of the present system is that the present system can create a wide variety of customized reports using the standardized oil and gas inspection data. These reports can be used to develop performance trends for vendors or equipment, develop performance trends for clients for process improvement, isolate repeated failures or rejections for process improvement, and operate as decision tools having performance indicators.

The wide variety of reports can be viewed by customers or managers from any location where access to the server network can be established, enabling data to be retrieved, viewed, collected, or updated from any number of remote locations. Furthermore, the process of data retrieval can be automated, such as by querying one or more performance indicators, causing certain reports or inspection information to automatically be collected by an administrator, manager, customer, or inspector's device.

The present system also advantageously allows new users to be setup easily through server management, giving clients and customers easy access to their data and reports.

Another benefit of the present system is that the capture of oil and gas inspection data allows the information to be transferred to other databases or electronic devices, such as radio frequency identification tags, for monitoring and tracking of related equipment, components, and assemblies, thus preventing theft, loss, or destruction of equipment.

The present system can include an inspection database server in communication with a distributed computer network, such as the internet, a local area network, a wide area network, a satellite network, a cellular network, and other similar networks. The inspection database server can be in communication with any number or any combination of networks.

The inspection database server can also include a processor. It is contemplated that the inspection database server can be in direct communication with the processor, or in wireless communication with a remote processor.

The present system further includes at least one server-side vendor inspection database in communication with the inspection database server. The server-side vendor inspection database can be used for receiving and storing customer information, such as customer names, companies, addresses, telephone numbers, e-mail addresses, and other similar information, and inspector information, such as inspector names, companies, addresses, telephone numbers, e-mail addresses, and other similar information.

It is contemplated that the present system can include one or more administrator interfaces for inputting customer information, inspector information, and combinations thereof to the inspection database server. The one or more administrator interfaces can also be used to input modifications to existing information, oil and gas inspection data, and other information. Administrator interfaces can include computers, cellular telephones, personal digital assistants, and other similar devices.

The present system can include one or more inspector client devices, such as a mobile type desktop computer, a handheld mini-computer, a cellular telephone, a personal digital assistant, or a laptop computer, in communication with the inspection database server. Each inspector client device can include an inspector client device processor in communication with inspector client device data storage.

At least one inspector-side vendor inspection database is in communication with the inspector client device processor for receiving and storing oil and gas inspection data about at least one vendor.

Oil and gas inspection data can include vendor or sub-vendor identifier information, such as a vendor name, vendor address and location, or vendor employees. Oil and gas inspection data can also include vendor material, component, and assembly information, such as material model numbers, material types, component types, assembly types, serial numbers, vendor equipment, vendor facilities, and other similar information. Oil and gas inspection data can further include vendor manufacturing information, such as dates of manufacture, or test result information, such as trace and heat numbers of materials, the number of materials, components, or assemblies accepted or rejected, total numbers of components, materials, and assemblies inspected, reasons for rejection, the percent of items rejected, non-conformance information, and summary actions taken by an inspector. Oil and gas inspection data can additionally include process improvement information for one or more vendors or sub-vendors.

It is contemplated that an inspector can input and store oil and gas inspection data into the inspector-side vendor inspection database using one or more inspector client devices.

The inspector client device can then communicate the oil and gas inspection data to the server-side vendor inspection database via the distributed computer network. The inspection database server can independently, sequentially, or simultaneously communicate the customer information, the inspector information, or combinations thereof to the inspector-side vendor inspection database. The inspector-side vendor inspection database and the server-side vendor inspection database are thereby synchronized.

The inspection database server can be adapted to automatically categorize the oil and gas inspection data by customer, well, project, equipment, or location. Other similar categories can also be used.

The present system can further include at least one customer client device, which can be a computer, a cellular telephone, a personal digital assistant, or other similar devices, in communication with the inspection database server. It is contemplated that each customer client device can access the oil and gas inspection data, the customer data, the inspector data, and combinations thereof, on the inspection database server via the distributed computer network, allowing one or more customers to view selected information.

The inspection database server can also include computer instructions for instructing the related processor to provide one or more reports using the oil and gas inspection data. The reports can include tables, and can be formatted or non-formatted. The reports can also include project reports, timesheet reports, payroll reports, and other similar reports. The reports can have any format, including Portable Document Format (PDF) files. The reports can be customized reports, standardized reports, or combinations thereof.

It is contemplated that multiple inspectors using multiple inspector client devices can input and store oil and gas inspection data relating to a single vendor or project to the inspection database server and produce multiple reports. For example, a first inspector may produce one report using oil and gas inspection data recorded during a day shift, a second inspector may produce a second report during a later shift, and additional inspectors may produce additional reports at other dates and times.

Each individual report can be assigned a unique number, or other identifier, which can include a time stamp and/or a project number, allowing individual reports to be referenced, viewed, or searched individually among other related or unrelated reports.

It is contemplated that each inspector client device and each customer client device can access any of the reports on the inspection database server over the distributed computer network for viewing on demand.

In an embodiment, one or more reports can be generated automatically at predefined intervals for communication to one or more inspectors, one or more customers, or combinations thereof. For example, a customer in need of instantaneous and real time information regarding manufacturers of a specific product could cause reports on venders who manufacture the specific product to be generated automatically and communicated to the customer's customer client device.

In an embodiment, one or more inspector client devices can include computer instructions for instructing the inspector client device processor to provide one or more reports using the oil and gas inspection data. Each inspector client device can then communicate one or more reports in addition to the oil and gas inspection data.

It is contemplated that the computer instructions can further instruct the inspector client device processor to store a copy of one or more reports in the inspector client device data storage, in addition to communicating the reports to the inspection database server.

It is contemplated that the present system can also include so one or more third party client devices in communication with the inspection database server for accessing the oil and gas inspection data, one or more reports, or combinations thereof. A third party client device can be used by a contractor, an employee of an outside firm, or other individuals or groups of individuals that are not inspectors or customers and have been authorized by a customer, client, or administrator to access the inspection database server. One or more security features, such as secure user log-in, information, and passwords, encryption features, and combinations thereof can be used to ensure only authorized individuals access the inspection database server.

The inspector client device can automatically communicate the oil and gas inspection data, one or more reports, or combinations thereof to the inspection database server, such as by communicating the oil and gas inspection data and synchronizing information with the inspection database server at periodic intervals.

The inspector client device can also simultaneously communicate oil and gas inspection data, one or more reports, or combinations thereof to multiple devices in communication with the distributed network, which can include communicating oil and gas inspection data to one or more customer devices and the inspection database server simultaneously.

In a contemplated embodiment, the customer information in the inspection database server can include accounting information, such as expense information, billing information, and similar information. The inspection database server can include computer instructions for instructing the processor to generate one or more accounting reports, bills, invoices, supporting documents, or combinations thereof using the accounting information. Supporting documents can include copies of any reports or oil and gas data, or any other documentation that clarifies or evinces the source of any items contained in a bill or invoice.

In an embodiment, the present system can include one or more remote devices for receiving the oil and gas inspection data, one or more reports, or combinations thereof from the inspection database server or an inspector client device. It is contemplated that the remote device can be a radio frequency identification tag reader-writer, such as an Identec reader-writer, for writing the oil and gas inspection data, one or more reports, or combinations thereof to one or more radio frequency identification tags. This can allow oil and gas equipment to be labeled and remotely tracked in real time, on a continuous or periodic basis, using the oil and gas inspection data or one or more reports.

The present system can further include one or more security features, which can include login protection means, such as requiring a user name and a password, an encryption means, such as 128-bit American Encryption Standard, other similar security features, and combinations thereof.

Referring now to FIG. 1, a diagram of the parts of an embodiment of the present system is depicted.

Inspector 46 is depicted in communication with inspector client device 20, which can be a portable computer, personal digital assistant, cellular telephone, or another similar device having one or more input means and displays. Inspector client device 20 is depicted having inspector client device processor 80 and inspector client device data storage 85.

Inspector client device data storage 85 contains inspector-side vendor inspection database 22, into which oil and gas inspection information 30a is input by inspector 46 while inspecting vendor 35. Vendor 35 can be any type of vendor or sub-vendor having any quantity or type of oil and gas equipment, components, assemblies, facilities, processes, employee qualifications, employee training, or employee certifications requiring inspection.

Inspector client device data storage 85 is also depicted having computer instructions 42, for instructing inspector client device processor 80 to produce a report 47 using oil and gas inspection data 30a.

Inspector client device 20 is in communication with inspection database server 5 over a distributed computer network 10, which can be the internet, a satellite network, a wireless network, a cellular network, a local area network, a wide area network, or other similar types of networks. Inspector client device 20 can communicate over distributed computer network 10 using any kind of connection, including a conventional line modem, a broadband wireless modem, a local area network type wireless or hard line connection, or other similar means.

Inspection database server 5 is depicted having a processor 6 and a server-side vendor inspection database 15. It is contemplated that server-side vendor inspection database 15 can be designed to include fields and categories identical to those of inspector-side vendor inspection database 22 to facilitate the standardization and synchronization of oil and gas inspection data and related reports.

Server-side vendor inspection database 15 is depicted having customer information 8, inspector information 9, accounting information 75, and oil and gas inspection data 30b. It is contemplated that server-side vendor inspection database 15 can receive and provide updated customer information 8, inspector information 9, and accounting information 75 to inspector-side vendor inspection database 22 while simultaneously receiving updated oil and gas inspection data 30b from inspector-side vendor inspection database 22.

Inspection database server 5 is also depicted having computer instructions 40 for instructing processor 6 to produce a report 45 using oil and gas inspection data 30b, customer information 8, inspector information 9, accounting information 75, or combinations thereof. Report 45 can be identical to report 47, produced by inspector client device processor 80, or report 45 can be a different report.

Administrator 92, who can be any administrator, manager, technician, or other individual or group of individuals responsible for maintaining or updating inspection database server 5, is depicted in communication with inspection database server 5 over distributed computer network 10 using an administrator interface 90. Administrator interface 90 can be any type of client device, graphical user interface, input device, computer, or other similar device able to transmit commands and data to inspection database server 5.

It is contemplated that administrator 92, through use of administrator interface 90, can produce and/or transmit one or more bills, invoices, or combinations thereof, or authorize billing to one or more customers using customer information 8, accounting information 75, or combinations thereof. It is also contemplated that administrator 92, through use of administrator interface 90, can modify report 45 or oil and gas inspection data 30b.

It is further contemplated that administrator interface 90 can be used to update, synchronize, standardize, modify, remove, or input data into server-side vendor inspection database 15, such as inputting or modifying customer information 8 or accounting information 75 when adding new customers or changing customer addresses.

A customer 29 is depicted in communication with inspection database server 5 over distributed computer network 10 using a customer client device 25. Customer client device 25 can be any kind of computer, cellular telephone, personal digital assistant, or other similar device having a display and one or more input means.

Customer client device 25 is depicted having a customer client device processor 26 and a customer client device display 27, which can be a monitor, a printer, a graphical user interface, or other similar display or printing means. Customer client device display 27 is depicted displaying oil and gas inspection data 30c and a report 46. Report 46 can be identical to or different from report 45 and report 47.

It is contemplated that customer 29, administrator 92, and inspector 46 can be proximate to or in direct communication with inspection database server 5, or remote from inspection database server 5 and in communication with inspection database server 5 via a wireless connection over distributed computer network 10.

Figure 2:
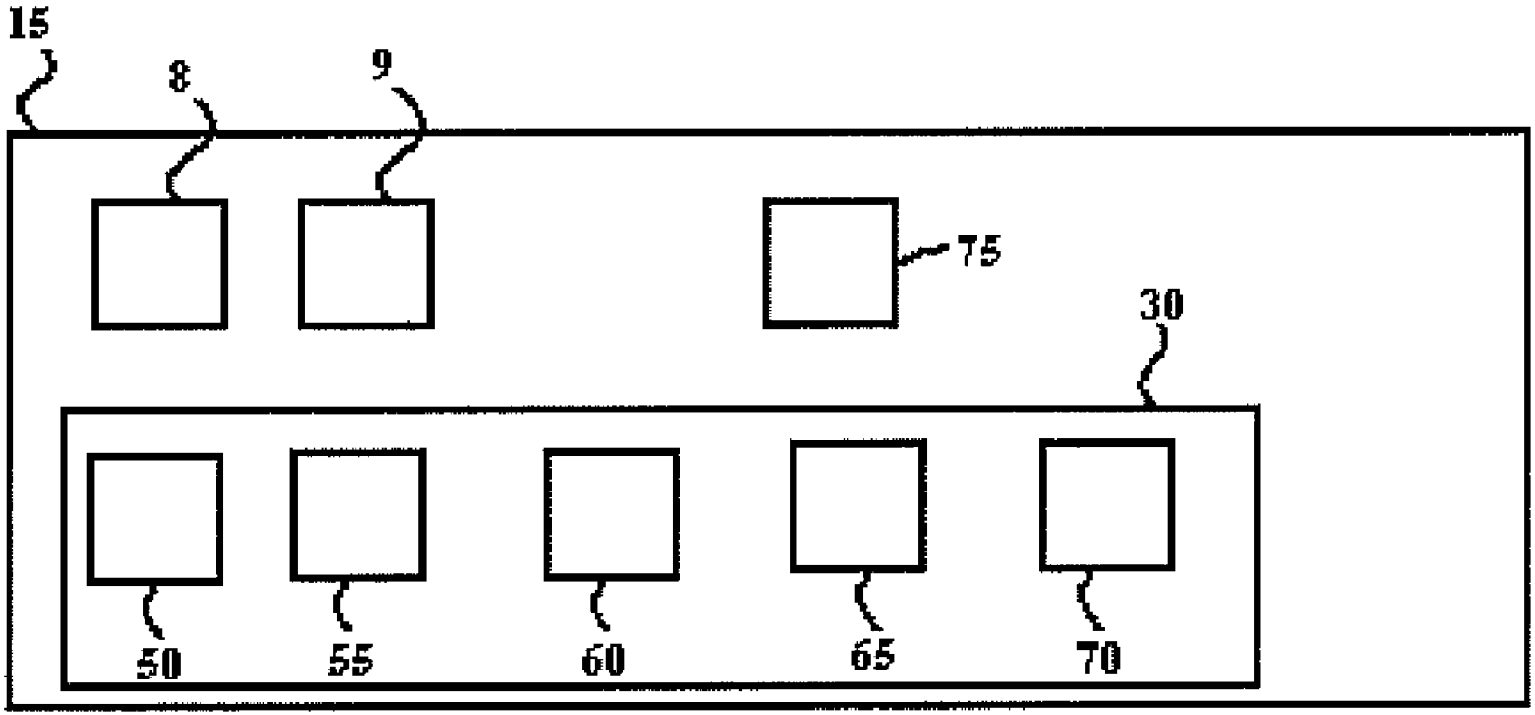
FIG. 2 depicts a diagram of the categories of information in an embodiment of a database.

Referring now to FIG. 2, a diagram of an embodiment of server-side vendor inspection database 15 is depicted.

Server-side vendor inspection database 15 is depicted having vendor information 8, which can include vendor addresses, names, employee identification information, vendor products, and other similar information. Server-side vendor inspection database 15 is also depicted having inspector information 9, which can include inspector names, addresses, contact information, and other similar information. Server-side vendor inspection database 15 also has accounting information 75, which can include customer addresses and contact information, credit card or bank account identifiers, billing information, such as billable hours, and other similar information.

Server-side vendor inspection database 15 also has oil and gas inspection data 30. Oil and gas inspection data 30 is depicted including vender identifier information 50, vendor material, component, and assembly information 55, vendor manufacturing information 60, test result information 65, and process improvement information 70. It is contemplated that oil and gas inspection data 30 can include any kind of information obtainable through inspection of a vendor.

While these embodiments have been described with emphasis on the embodiments, it should be understood that within the scope of the appended claims, the embodiments might be practiced other than as specifically described herein.

What is claimed is:

1. A computer-implemented system for recording oil and gas inspection data in an on-line computing environment, comprising:

an inspection database server comprising a processor in communication with a distributed computer network;

at least one server-side vendor inspection database in communication with the inspection database server for receiving and storing customer information and inspector information;

at least one inspector client device adapted for communication with the inspection database server, wherein the at least one inspector client device comprises an inspector client device processor in communication with inspector client device data storage;

at least one inspector-side vendor inspection database in the inspector client device data storage and in communication with the inspector client device processor for receiving and storing oil and gas inspection data about at least one vendor; wherein at least one inspector inputs the oil and gas inspection data to the at least one inspector-side vendor inspection database using the at least one inspector client device;

at least one customer client device in communication with the inspection database server, wherein the at least one inspector client device is adapted to communicate the oil and gas inspection data to the at least one customer client device and the inspection database server, wherein the at least one server-side vendor inspection database is synchronized sequentially and simultaneously for real time receiving and updating with the at least one inspector-side vendor inspection database using the distributed computer network to automatically communicate the oil and gas inspection data to the inspection database server;

wherein the at least one inspector client device is adapted to simultaneously and automatically communicate the oil and gas inspection data to the at least one customer client device and the inspection database server;

wherein the inspection database server comprises: server computer instructions for instructing the inspection database server to provide at least one report using the oil and gas inspection data;

at least one remote device for capturing the oil and gas inspection data and allowing the information to be transferred to the inspection database server, the at least one inspector client device, the at least one customer client device, or combinations thereof, for monitoring and remotely tracking in real time the oil and gas inspection data;

wherein the at least one inspector client device further comprises client computer instructions for instructing the at least one inspector client device to use the oil and gas inspection data to produce at least one customized report, at least one standardized report, or combinations thereof using the oil and gas inspection data, and to store the at least one customized report, the at least one standardized report, or combinations thereof in the inspector client device data storage; and the at least one report is generated automatically at predefined intervals for communication to the at least one inspector, the at least one customer, or combinations thereof;

wherein the at least one inspector client device and the at least one customer client device are operable to access the oil and gas inspection data, and the at least one report, on the inspection database server; and wherein the server computer instructions instruct the inspection database server to formulate the at least one report for selected oil and gas inspection data and communicate the at least one report to the at least one customer device for viewing by at least one customer upon demand.

2. The computer-implemented system of claim 1, wherein the at least one inspector client device is a mobile type desktop computer, a hand held mini-computer, a cellular telephone, a personal digital assistant, or a laptop computer.

3. The computer-implemented system of claim 1, further comprising at least one third party client device in communication with the inspection database server for accessing the oil and gas inspection data, the at least one report, or combinations thereof.

4. The computer-implemented system of claim 1, wherein the inspection database server is adapted to categorize the oil and gas inspection data.

5. The computer-implemented system of claim 1, wherein the customer information comprises accounting information, and wherein the inspection database server further comprises computer instructions to instruct the processor to generate at least one accounting report, at least one bill, at least one invoice, at least one supporting document, or combinations thereof using the accounting information.

6. The computer-implemented system of claim 1, wherein the at least one remote device is for receiving the oil and gas inspection data, the at least one report, or combinations thereof.

7. The computer-implemented system of claim 6, wherein the at least one remote device is a radio frequency identification tag reader-writer for writing the oil and gas inspection data, the at least one report, or combinations thereof to at least one radio frequency identification tag.

8. The computer-implemented system of claim 1, further comprising at least one administrator interface for inputting customer information, inspector information, modifications, and combinations thereof in the inspection database server.

9. The computer-implemented system of claim 1, further comprising at least one security feature for controlling access to the inspection database server.

10. The computer-implemented system of claim 9, wherein the at least one security feature is a user name and password, an encryption means, or combinations thereof.

11. The computer-implemented system of claim 1, wherein the at least one report is at least one customized report, at least one standardized report, or combinations thereof.

12. The computer-implemented system of claim 1, wherein the at least one report is assigned at least one unique identifier.

*13. A system for reporting oil and gas inspection data, comprising:*

*an administrator interface adapted to receive customer information from an administrator;*

*an inspector client device adapted to receive the oil and gas inspection data from an inspector and to produce a first report using the oil and gas inspection data;*

*an inspection database server in communication with the administrator interface and the inspector client device, the inspection database server adapted to receive the customer information from the administrator interface, to receive the oil and gas inspection data and the first report from the inspector client device, and to produce a second report that is different than the first report using the customer information and the oil and gas inspection data; and*

*a customer client device in communication with the inspection database server, the customer client device adapted to receive at least one of the first report and the second report from the inspection database server, wherein*

*the inspection database server is synchronized sequentially or simultaneously with the inspector client device for real time receiving and real time updating with the oil and gas inspection data from the inspector client device, and*

*the inspector client device is further adapted to simultaneously and automatically communicate the oil and gas inspection data to the customer client device and the inspection database server.*

*14. The system of claim 13, wherein the inspector client device is further adapted to receive the second report from the inspection database server.*

*15. The system of claim 13, wherein the inspector client device is further adapted to simultaneously receive the customer information from the inspection database server.*

*16. The system of claim 13, wherein the inspector client device is further adapted to sequentially receive the customer information from the inspection database server.*

*17. The system of claim 13, wherein the inspection database server is further adapted to independently transmit the customer information to the inspector client device.*

*18. The system of claim 13, wherein the administrator interface is further adapted to receive at least one of inspector information and accounting information from the administrator, and the inspection database server is further adapted to receive the at least one of inspector information and accounting information from the administrator interface.*

* * * * *